United States Patent [19]

Ikeda et al.

[11] 4,253,341

[45] Mar. 3, 1981

[54] WATER METER COMPRISING A FERROMAGNETIC MAGNETORESISTOR COUPLED TO A ROTATABLE PERMANENT MAGNET

[75] Inventors: Mamoru Ikeda, Funabashi; Noboru Yamazaki, Noda; Jun Fukui, Machida; Kazuhiko Shirai; Takesh Yano, both of Tokyo, all of Japan

[73] Assignee: Nippon Electric Co., Ltd., Tokyo, Japan

[21] Appl. No.: 33,027

[22] Filed: Apr. 24, 1979

[30] Foreign Application Priority Data

Apr. 25, 1978 [JP] Japan ................................. 53-49507

[51] Int. Cl.³ ............................................ G01F 1/075
[52] U.S. Cl. ............................................... 73/861.77
[58] Field of Search ...................... 73/229, 231, 194 E; 233/92 FL, 92 FQ; 364/510

[56] References Cited

U.S. PATENT DOCUMENTS

| B 442,946 | 1/1976 | Siegel | 235/92 X |
|---|---|---|---|
| 3,595,081 | 7/1971 | Byars | 73/231 |
| 3,636,767 | 2/1972 | Duffy | 73/229 |
| 3,729,996 | 5/1973 | Metz | 73/231 X |
| 3,965,341 | 6/1976 | Honey | 73/194 X |
| 4,048,852 | 9/1977 | Sanakibara | 73/193 |

OTHER PUBLICATIONS

American Water Works Association, M6 Meter Manual.

Primary Examiner—Herbert Goldstein
Attorney, Agent, or Firm—Laff, Whitesel & Rockman

[57] ABSTRACT

A water meter eliminates the usual conversion gear trains by using a permanent magnet which rotates in proportion to the volume of water to be measured. A magnetic field sensor, comprising a ferromagnetic magnetoresistor, produces a sensor signal which varies as a function of the rotation of the magnet. A wave shaper forms the sensor signal into a sequence of pulses which drive a totalizer for producing a signal indicative of the volume of the water used. The output of the totalizer is supplied to an indicator device which displays the total amount of water passing through the meter, in terms of a predetermined unit of measure. Preferably, the sensor comprises at least two magnetoresistors for producing two sensor signals with a phase difference therebetween. The wave shaper then produces two pulse sequences for identifying a normal and an inverse flow of water, respectively. These two sequences cause the totalizer to count up or down, respectively.

7 Claims, 9 Drawing Figures

WATER METER COMPRISING A FERROMAGNETIC MAGNETORESISTOR COUPLED TO A ROTATABLE PERMANENT MAGNET

BACKGROUND OF THE INVENTION

This invention relates to water meters and, more particularly, to water meters having a rotatable body (such as a propeller mounted on spindle) which turns in proportion to the volume of water that is measured, and to means for electronically totalizing the number of rotations of the body to give a preferably digital readout.

A conventional water meter has a propeller or turbine in a path, such as in a conduit or pipe, which the water follows for example. Several conversion or reduction gear trains transmit the rotations of the propeller to a plurality of pointers, hands, indicators, or registers to show predetermined volume units of a measure, which indicates the volume of the water used.

Such conventional water meters have long been used and are usually characterized by a simple mechanical structure. However, the conventional water meter is deficient, mainly in three points. First, the rotation of the gears and movement of other parts are gradually and adversely affected by wear, during long use of the meter. There is an accumulation thereon of a mineral buildup that is usually called "scale." Second, it is impossible to measure a weak current or low-volume flow of water because the torque given thereby is insufficient to drive the gears. Although, attempts have been made to reduce the driving torque to a minimum, it cannot be reduced beyond a certain limit if gears are used. Third, a strong water flow reduces the serviceable life of the meter because the gears are too heavily loaded, and that introduces excessive wear on the bearings.

In addition, different sets of conversion gear trains have to be prepared for different diameter conduits and for different units of measure. Inasmuch as there are relatively few teeth on each of the gears, an error of about 0.5% is inevitable, with flow-to-readout conversion by mechanical gears.

SUMMARY OF THE INVENTION

Therefore, an object of the present invention is to provide a water meter having no mechanical gears, with a result that operation of the meter is not adversely affected, in any substantial degree, by either wear of movable parts or an accumulation of scale.

Another object of this invention is to provide a water meter of the type described, which is capable of measuring a weak or low-volume flow of water.

Still another object of this invention is to provide a water meter of the type described, which can measure a strong water flow without shortening the life of the meter.

A further object of this invention is to provide a water meter comprising a conversion device for converting signals generated responsive to a rotation of a body in a path for water flow. These signals are converted into an indication of the measured volume of water. The device is readily adapted for use in paths of different diameters, to record water usage in terms of various units of measure.

A still further object of this invention is to provide a water meter, of the type described, wherein the conversion is sufficiently precise despite fluctuations in the flow of water.

In keeping with an aspect of the invention, this invention is applicable to a water meter having a path for conveying the water which is to be measured, in terms of a predetermined unit of volume. A rotatable body is located in the path to turn a number of times which are proportional to the volume of the water that flows through the path. A suitable meter indicates the volume of the water used responsive to signals generated responsive to the turning of the rotatable body. These signals are sent to an indicating means which convert the number of body rotations into the volume of the metered water, the indication being displayed in terms of the predetermined unit of measurement.

According to this invention, the signal generating means comprises a permanent magnet which turns with the rotatable body and a magnetic field sensor comprising a ferromagnetic, magnetoresistive element having an axis which is oriented to pick up field variations responsive to the magnet rotations. The sensor further produces a sensor output signal responsive to the field variations experienced by the element. The signal generating means further comprises wave-shaping means for shaping the sensor output signal into a sequence of pulses, totalizing means operated responsive to the pulse sequence for totalizing the number of these pulses (in terms of the predetermined unit of measurement) to indicate the volume of the water used, and means for supplying the totalizer output signal to an indicating means which provides a visible display.

Figure 1:
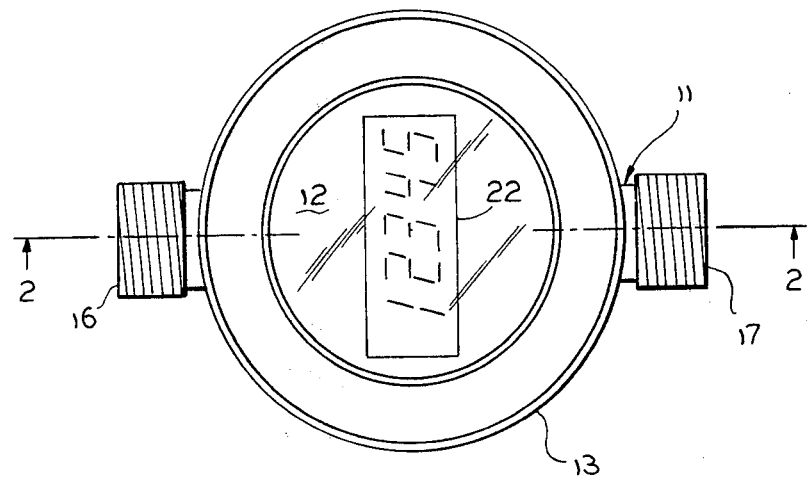
FIG. 1 is a schematic, top view of a water meter according to a preferred embodiment of the instant invention.
Figure 2:
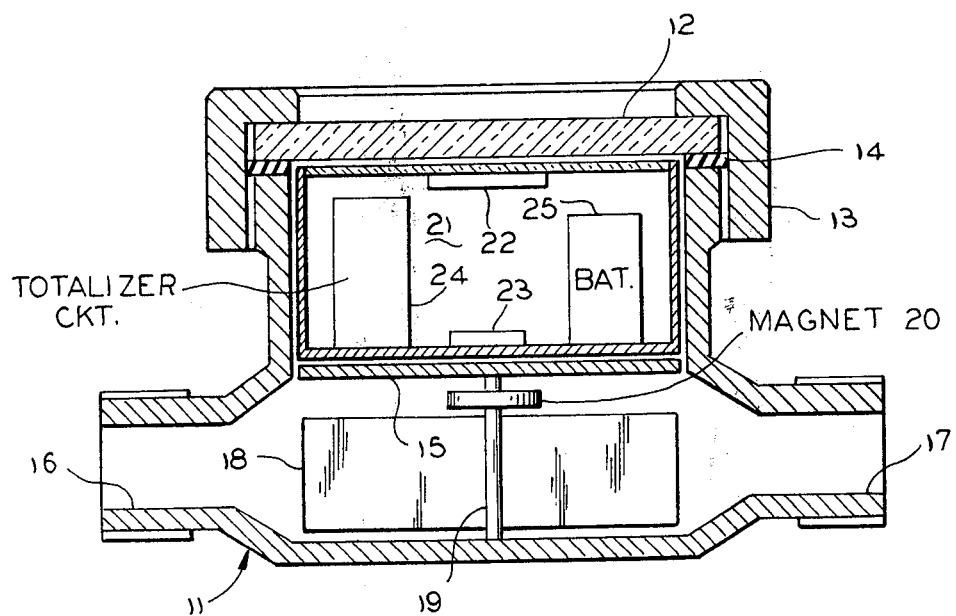
FIG. 2 is a schematic, vertical sectional view taken on a plane indicated by a line 2—2 in FIG. 1.

DESCRIPTION OF THE PREFERRED EMBODIMENTS:

FIGS. 1 and 2, of the accompanying drawing, show an exemplary electronic water meter according to a preferred embodiment of the invention. It may be a type similar to that known in the art, as a single-jet water meter.

The inventive electronic water meter comprises a casing 11, a glass cover 12, and a nut 13 uniting the casing 11 and the cover 12 into a watertight unit, with an annular packing or gasket 14 interposed therebetween. A division plate or partition 15 is fixedly placed inside the casing 11 to define a lower chamber serving as a water conduit or path extending between inlet and outlet ports 16 and 17 of the casing 11. An upper chamber above plate 15 contains a conversion gear train, and the like, mentioned hereinabove. These units are parts of a conventional mechanical water meter housing. A propeller or multi-blade rotor 18 is rotatable in the lower chamber and has an affixed spindle 19 supported by a pair of bearings (not shown) in the casing 11 and the partition 15. Rotation of the propeller 18 and its affixed spindle 19 is proportional to the volume of water that flows through the water path below partition 15.

The water meter illustrated in FIGS. 1 and 2 comprises a permanent magnet 20 fixed to and rotatable with the spindle 19, in the lower chamber of the metal casing 11. An electronic circuit 21 is snugly received and housed in the upper housing chamber. An indicator 22 is visible through the cover glass 12, for displaying the volume of the water used. This indicator comprises a plurality of luminescent electrodes, such as seven light-emitting diodes or liquid crystal elements for each displayed digit, and may be used to provide a luminescing display. Therefore, the indicator 22 is included herein with the electronic part 21, for convenience of description.

The electronic part 21 has a sensor circuit or magnetic field sensor 23 which detects and responds to the rotation of the magnet 20, for producing a pair (or other) sensor output signals. A totalizer circuit 24 is responsive to the sensor output signals and supplies the indicator 22 with output signals which are indicative of that volume of the water used. A battery 25 energizes the indicator 22, the magnetic field sensor 23, and the totalizer circuit 24.

Figure 4:
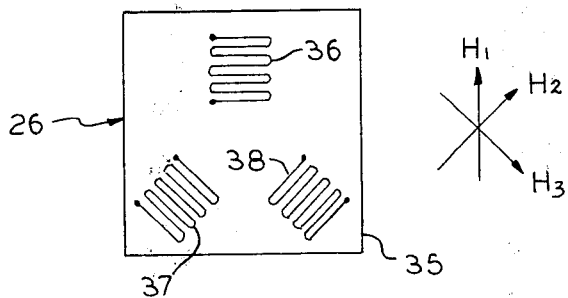
FIG. 4 is a schematic top view of a ferromagnetic, magnetoresistive member of a magnetic field sensor used in the electronic part.
Figure 5:
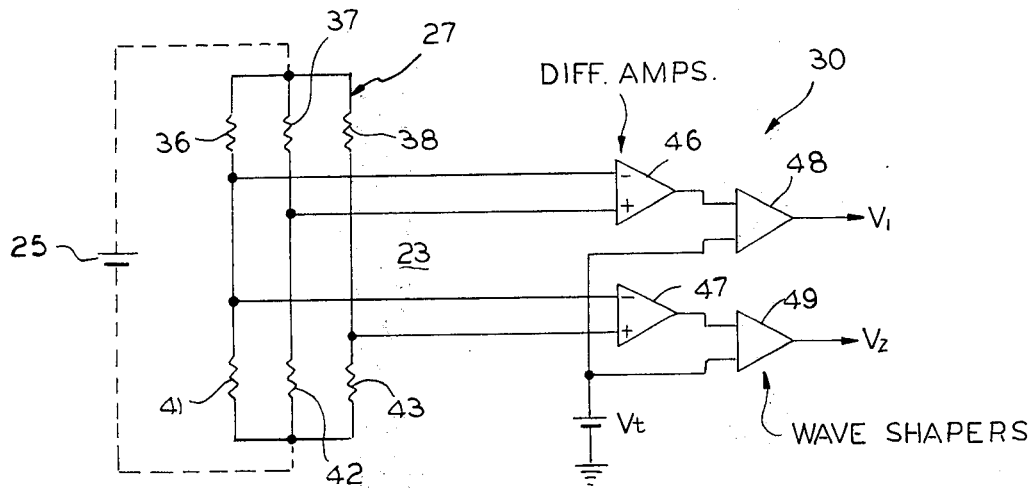
FIG. 5 shows, partly in block diagram, a magnetic field sensor and, more particularly, a bridge circuit and a wave-shaping circuit used in the electronic portions of the inventive meter.

The magnetic field sensor 23 comprises a ferromagnetic magnetoresistive member 26 (FIG. 4) and a bridge circuit member 27 (a portion of FIG. 5). A combination of the magnet 20, the magnetic field sensor 23, and the totalizer circuit 24 performs the functions which heretofore required several conversion gear trains, in a conventional mechanical water meter. Preferably, the magnet 20 is a disk having a diameter about 10 mm and a thickness which may be between 2 and 3 mm, and produces a magnetic field of 30 and 40 gausses on planes which are spaced away from the disk surface by 6.0 and 5.5 mm, respectively. The battery 25 may, for example, include two lithium batteries that have a total electromotive force of 5.6 volts and a life of about 10 years, even if used continuously in the meter.

Figure 3:
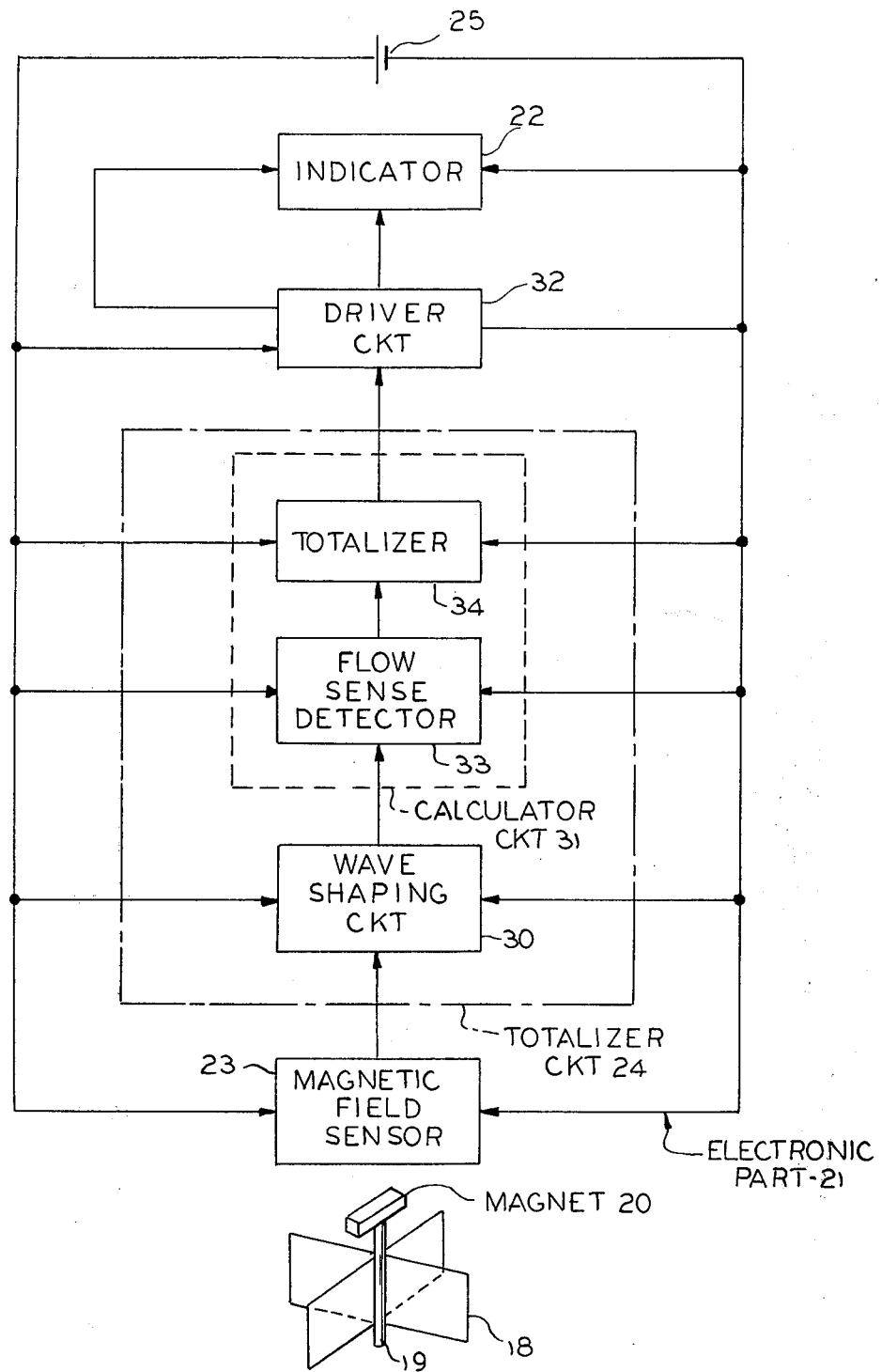
FIG. 3 is a block diagram of an electronic part used in a water meter, according to a first embodiment of this invention, with a permanent magnet depicted in a schematic perspective view together with a spindle which is rotatable with a propeller driven by water passing through the meter.

FIG. 3 is a block diagram of an electronic part 21 of a water meter, according to a first embodiment of this invention. This diagram includes an indicator 22, a magnetic field sensor 23, and a totalizer circuit 24. The totalizer circuit 24 comprises a wave-shaping circuit 30 for shaping the pair of sensor output signals into a pair of phase-displaced, pulse sequences.

A calculator or conversion circuit 31, of the totalizer circuit 24, responds to these pulse sequences for producing the totalizer output signal. More particularly, the calculator circuit 31 comprises a flow sense detector 33 which operates responsive to the pulse sequences for producing pulses of either a normal or an inverse signal, depending upon the direction of water flow at any given time. The normal pulse signals represent a rotation of the permanent magnet 20 caused by the water flowing through the path, in a normal direction from the inlet port 16 to the outlet port 17. The inverse signals represent a water flow in an inverse or reversed sense from the outlet port 17 to the inlet port 16. A totalizer 34, of the calculator circuit 31, is responsive to either of the flow pulse signals and counts the number of pulses in the pulse signal being supplied thereto.

The indicator 22 is accompanied by a driver circuit 32 which responds to the output signal of totalizer 24 for supplying the indicator 22 with a driving signal for controlling at least one of the light-emitting diodes or a similar luminescent signalling device. The counted number of pulses are displayed at 22 in terms of a number of units of a predetermined measure or volume of water. The shaping circuit 30, the calculator circuit 31, the flow sense detector 32, and the totalizer 34 are all energized by the battery 25.

FIG. 4 provides an example of a suitable ferromagnetic magnetoresistive element or member 26 of the magnetic field sensor 23. This sensor is magnetically coupled into the field of the rotatable permanent magnet 20, with the coupling being completed through the partition 15 and any suitable housing for the electronic part 21. The member 26 comprises a substrate 35 of nonmagnetic material, such as a silicone single crystal or glass. The substrate area is about 5 mm square and has a thickness about 0.5 mm. First through third ferromagnetic magnetoresistors or magnetoresistive elements 36, 37 and 38 are formed by a serpentine line deposited on the substrate 35. A pair of terminals of an electroconductive material, such as gold or copper, are provided for supplying a sensing current to each ferromagnetic magnetoresistive element.

The elements 36 through 38 may be formed by evaporating a ferromagnetic material, such as an alloy of iron, nickel, and cobalt, onto the substrate 35 to form a film having a thickness between 0.01 and several microns. A film is then etched by a known photoresist process to form three continuations of primarily parallel lines of the ferromagnetic material. Each line is a few scores of microns wide. Each continuation is preferably several millimeters long, as measured along the line.

The direction of the sensing current for the first element 36 (or that axis thereof which is defined by the parallel lines) forms an angle of 45° with respect to each of the directions of the sensing currents for the second and the third elements 37 and 38. The directions of the sensing currents for elements 37,38 are perpendicular to each other.

Depending upon whether a magnetic field positioned near a ferromagnetic magnetoresistive element is perpendicular or parallel to the direction of the sensing current, the electrical resistance of an element does or does not decrease, respectively. Therefore, the resistances of the first through the third elements 36 through 38 decrease and increase periodically when exposed to either a continuously or an intermittently rotating permanent magnet 20. This is because the rotating magnet cyclically orients its flux as here represented by first through third magnetic fields $H_1$, $H_2$ and $H_3$. The flux field may be a few scores of gausses, taken perpendicular to the directions of the sensing currents for the respective elements 36 through 38. It is clear that the direction or the axis of the elements may also be defined in other ways. It is also obvious that the first through the third magnetic fields $H_1$ through $H_3$ are produced with relative phase differences between any two thereof. The terrestrial magnetism has no appreciable effects on the variation of the resistances of the elements 36 through 38 even if the metal casing 11 is not used as a magnetic shield. It is also possible to use the ferromagnetic magnetoresistive member 26 when it is turned upside down, as compared with the position seen in FIG. 4.

FIG. 5 gives an example of a bridge circuit member 27 which may be used in the magnetic field sensor 23 of FIG. 3, in combination with the ferromagnetic magnetoresistive elements of member 26, as exemplified by the structure of FIG. 4.

Bridge 27 supplies the sensing currents from the battery 25 (depicted by dashed lines) to the first through the third ferromagnetic magnetoresistive elements 36 through 38 and thereby derives first and a second sensor output signals, as will become clear. The illustrated bridge circuit member 27 includes a first bridge circuit comprising first and second resistive elements 36 and 37 connected in series with first and second bridge arm resistive elements 41 and 42. The elements 36 and 37 produce a first sensor output signal. A second bridge circuit, partly overlapping the first bridge circuit, comprises the first and the third elements 36 and 38, connected in series with the first bridge arm resistor 41, and a third bridge arm resistor 43. The third element 38 derives the second sensor output signal.

The sense of the current flow in the first sensor output signal is different during the intervals while the permanent magnet 20 produces the first and the second magnetic fields $H_1$ and $H_2$, respectively, during either the continuous or the intermittent rotation thereof. Likewise, the sense of current flow of the second sensor output signal is different during those intervals while the magnetic field becomes the third and the first magnetic fields $H_3$ and $H_1$.

Figure 6:
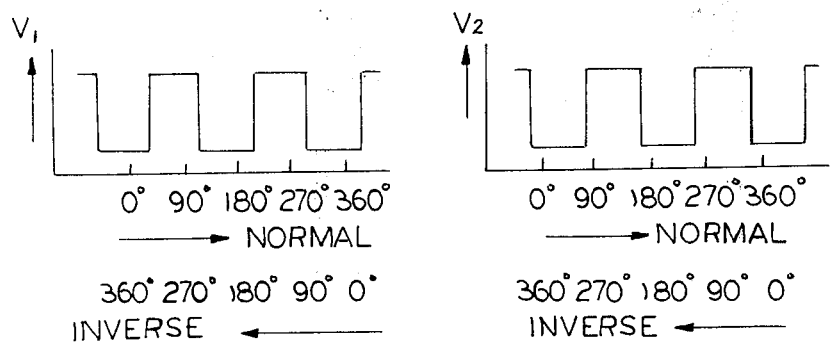
FIG. 6 illustrates a pair of phase-displaced, pulse sequences produced by the wave-shaping circuit of FIG. 5.

FIG. 5 also shows the shaping circuit 30 which comprises first and second differential amplifiers 46 and 47 for amplifying the first and the second sensor output signals, respectively. First and second shapers 48 and 49 shape the respective amplified sensor output signals, by a use of a common threshold voltage $V_t$. The shaped signals are in the form of pulses of first and second sequences $V_1$ and $V_2$ (FIG. 6), respectively. For the exemplified permanent magnet 20, magnetic field sensor 23, and battery 25, the threshold voltage $V_t$ may be 2.8 volts and can be readily derived from the battery 25. It is possible to use different threshold voltages for the shapers 48 and 49, in which case the pulse sequences $V_1$ and $V_2$ have different duty cycles.

The first pulse sequence $V_1$ (FIG. 6) builds up and down or rises and falls twice during each one complete revolution of the continuously or intermittently rotating permanent magnet 20. The buildup occurs at 30° and 210° in the rotational phase of the magnet resulting from the water flow in the normal sense, and at 60° and 240° when the water flow is in the reverse direction. The second pulse sequence $V_2$ builds up and down with a phase difference of 45° relative to the phase of the first pulse sequence $V_1$. For normal water flow, the first pulse sequence $V_1$ builds up and down during the time when the second pulse sequence $V_2$ is at a low and a high level, respectively. When the water flows in the reverse direction, the first pulse sequence $V_1$ builds up and down while the second pulse sequence $V_2$ is maintained in the high and the low levels, respectively.

Figure 7:
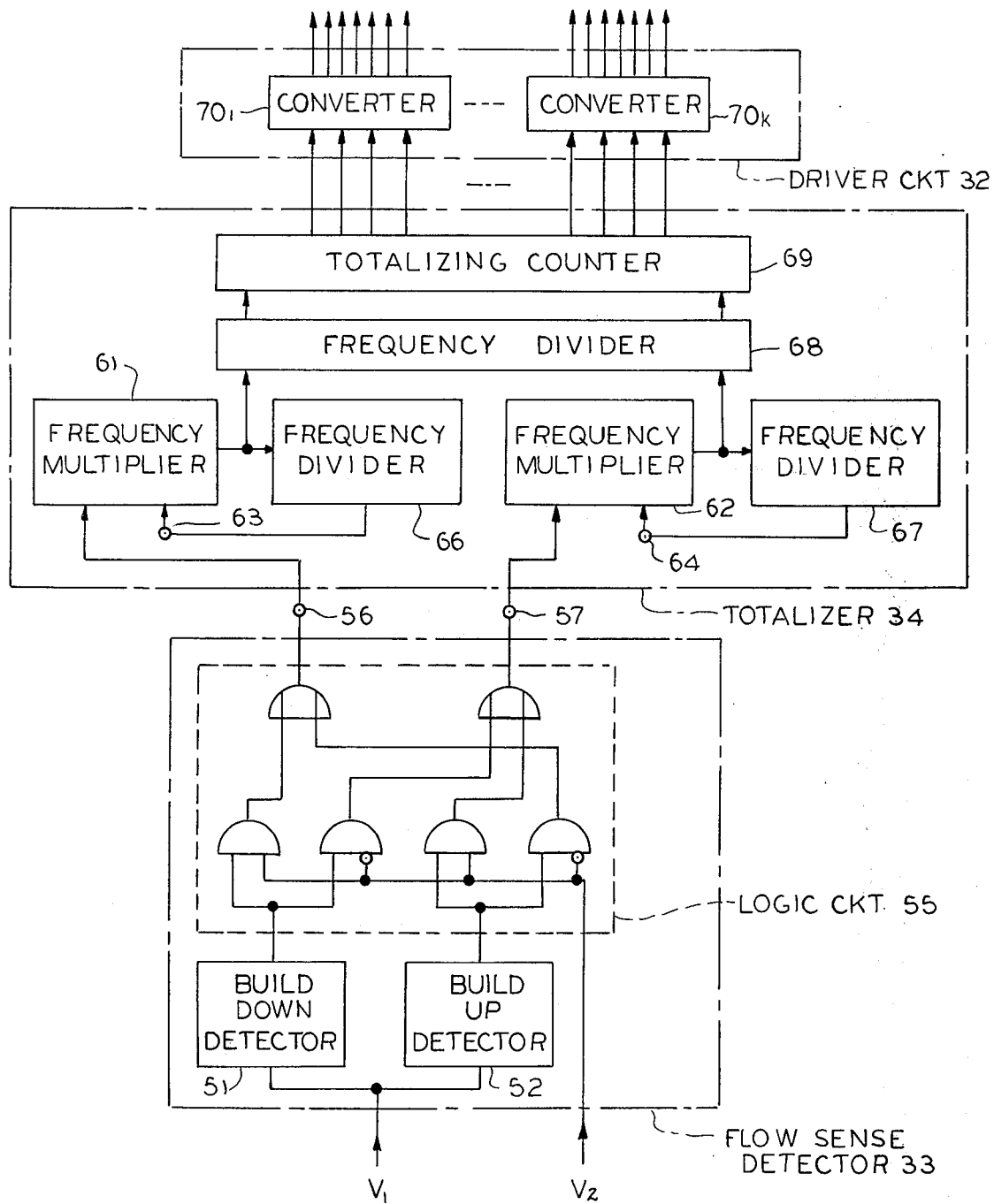
FIG. 7 is a block diagram of a flow sense detector, a totalizer, and a driver circuit for use in the electronic part of the invention.

In FIG. 7, the flow sense detector 33 of the calculator circuit 31 comprises a build-down detector 51 which responds to the trailing edges of first pulse sequence $V_1$ for producing a sequence of build-down detection pulses which are indicative of the instants when the first pulse sequence $V_1$ builds down. Buildup detector 52 responds to the leading edges in the first pulse sequence $V_1$ for producing a sequence of buildup detection pulses which are indicative of the buildup of the pulses of the first pulse sequence $V_1$. A combination of gates or logic circuit 55 provides normal and inverse flow pulse signals at output terminals 56 and 57, respectively, responsive to the build-down and the buildup detection pulse sequences and to the second pulse sequence $V_2$. Logic circuit 55 supplies the normal and inverse flow of pulse signals to the respective pulse signals output terminals 56 and 57. It should be noted that either of the normal and the inverse flow of pulse signals may be produced at any time.

In FIG. 7, the totalizer 34 of the calculator circuit 31 comprises first and second frequency multipliers 61 and 62 having stop terminals 63 and 64, respectively. These multipliers are used for frequency multiplying the normal and the inverse flow of pulse signals, respectively. A first frequency divider or demultiplier 66 divides the frequency of the normal flow of pulse signal in order to supply a stop pulse to the stop terminal 63 of the first frequency multiplier 61. A second frequency divider 67 divides the frequency of the inverse flow of pulse signal in order to deliver a stop pulse to the other stop terminal 64. Each of the frequency multipliers 61 and 62 may include a multivibrator (not shown) which is triggered by either the normal or the inverse flow pulse signals. The operation of the multivibrator is suspended by the successive stop pulses, for producing an intermittent sequence of local pulses.

Therefore, a combination of the frequency multiplier and divider 61 and 66 or 62 and 67 generates a pulse responsive to each pulse of either the normal or the inverse flow pulse signal. A result is the production of a first predetermined number of local pulses within a predetermined interval of time before an appearance of another pulse in either the normal or the inverse flow of pulse signals, and within the shortest possible period that next follows a pulse which triggers the multivibrator.

A single counter or frequency divider 68 divides the intermittent local pulse sequences from the respective pulse producers 61–66 or 62–67 in order to provide a normal and an inverse flow of count signals which are indicative of or proportional to the volume of the water flowing through the path in either the normal or the reverse directions, respectively. The single counter 68 actually serves as two counters for counting the pulses supplied from the respective pulse producers 61–66 and 62–67 in order to produce a pulse each time that the count reaches a second predetermined number.

A totalizing counter 69 of the totalizer 34 counts up and down responsive to the normal and the inverse flow count signals, respectively, to produce the totalizer output signal. In the illustrated example, the totalizing counter 69 is a decimal counter for deriving the totalizer output signal in binary-coded decimal codes. It is well-known that each digit of such a totalizer output signal is given by a four-bit code.

More specifically, it may now be presumed that the spindle 19 and the rotatable permanent magnet 20 complete one rotation when 56.5 cc's of water have flowed through the path in either the normal or the reverse direction. If it is desirable to provide one pulse in each of the normal and the inverse flow count signals responsive to an actually metered volume of 100 cc's of water, the ratios of the frequency multiplication and division carried out at each of the pulse producers 61-66 and 62-67 and at the single counter 68 should be proportional to 113 and 400 because the relation for conversion is given by:

$$56.5/(2 \times 100) = 113/400.$$

In FIG. 7, the driver circuit 32 for indicator 22 (FIG. 3) comprises a plurality of converters $70_1, \ldots$, and $70_k$, equal in number to the number of digits visually displayed by the indicator 22. Each driver circuit has seven output leads which are to be connected to the light-emitting diodes, or the like, for each displayed digit, respectively. Each of the converters 70 (suffix omitted) is responsive to the respective digits of the totalizer output signal for supplying an appropriate driving signal to at least one of the pertinent output leads. Each of the converters 70 may, for example, be MC 14558B described in "Motorola Semiconductor Data Library/C-MOS" published 1976 by Motorola Inc., Illinois, U.S.A., Volume 5, page 5,427.

Figure 8:
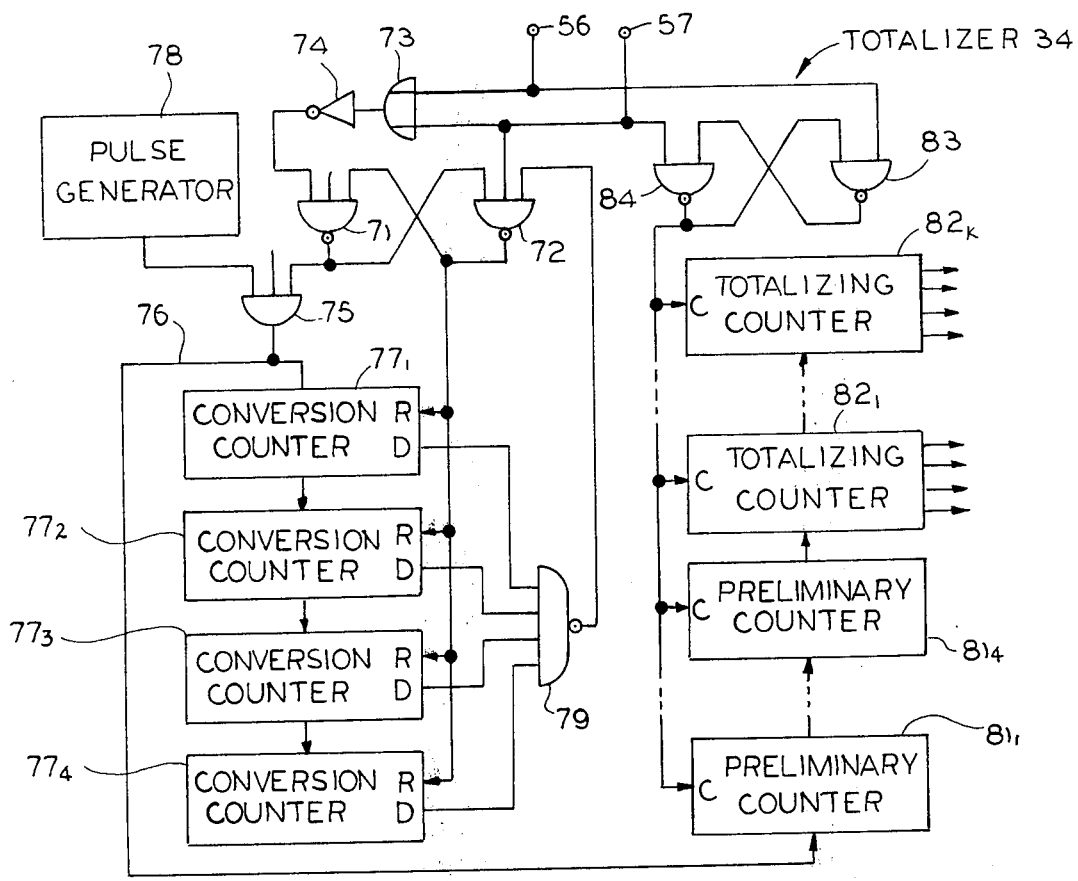
FIG. 8 is a block diagram of a totalizer for use in an electronic part of a water meter, according to a second embodiment of this invention.

FIG. 8 shows a totalizer 34 for the electronic part 21 (FIG. 2) used in a water meter according to a second embodiment of this invention. This totalizer comprises first and second, two-input NAND gates 71 and 72. The second NAND gate 72 supplies an output signal to one input of the first NAND gate 71, among others. Each pulse in either the normal or the inverse flow of pulse signals, produced by the flow sense detector 33 (FIGS. 3 and 7), is supplied through inputs 56,57, as a logic "0" pulse, to the other input of the first NAND gate 71 via an OR gate 73 and an inverter 74. Thus, irrespective of the logic level of the output signal of the second NAND gate 72, the first NAND gate 71 delivers a logic "1" pulse to an AND gate 75 having an output connected to a conductor lead 76 and successively to first through fourth conversion counters $77_1$, $77_2$, $77_3$ and $77_4$. Each of these counters has a reset or clear input and divided output terminals R and D.

A clock or local pulse generator 78 supplies a continuous sequence of clock or local pulses to the AND gate 75. During the simultaneous presence of the logic "1" pulse supplied from the first NAND gate 71 and a clock pulse from generator 78, the AND gate 75 delivers a local pulse to the conductor 76 and to the first conversion counter $77_1$. The conversion counters 77 (suffix omitted) cooperate with one another to count the local pulses and to simultaneously supply logic "1" pulses from the divide output terminals D to a single NAND gate 79 when the count reaches a predetermined number n. The NAND gate 79 now delivers a logic "0" signal to the second NAND gate 72, which supplies a logic "1" signal to the counters 77 to clear or reset the counters, and to the first AND gate 71 to disable the gates 71,75.

In FIG. 8, it is now understood that a combination of the AND gate 75, the conversion counters 77, and the related circuit, such as the single NAND gate 79, serves as a resettable counter for delivering n local pulses from the pulse generator 78 to the conductor lead 76 in response to each pulse of a single pulse signal. Either the normal or the inverse flow of pulse signals is produced by the flow sense detector 33. Each time when n local pulses are supplied to the conductor 76, the resettable counter is automatically reset to zero. The resettable counter is reset before an appearance of the single pulse signal of a pulse next following the pulse in response to which the resettable counter has delivered the n local pulses to the lead 76. Therefore, it is necessary for the repetition frequency of the local pulses to be sufficiently high, for example, 150 kHz. Each of the conversion counters 77 may be μPD 4017C described in "NEC CMOS Digital IC," the third edition, published 1977 by Nippon Electric Co., Ltd., of Tokyo, Japan, pages 36-38.

In the totalizer 34 depicted in FIG. 8, the conductor 76 is connected to a first preliminary counter $81_1$, which is consecutively connected to second through fourth preliminary counters $81_2$ (now shown) through $81_4$ and first through k-th totalizing counters $82_1$ through $82_k$. Each of the counters 81 and 82 (suffix omitted) has a control terminal C. The totalizer 34 further comprises third and fourth, two-input NAND gates 83 and 84. The third NAND gate 83 receives the normal flow of pulse signal from the flow sensing detector 33 (FIG. 7) and an output signal from the fourth NAND gate 84. The fourth NAND gate 84 receives the inverse flow pulse signal and an output signal of the third NAND gate 83. Therefore, the fourth NAND gate 84 produces logic "1" and "0 signals, respectively responsive to the normal and the inverse flow of pulse signals, supplied thereto one at a time.

These logic "1" and "O" signals are supplied to the control terminals C of the preliminary and the totalizing counters 81 and 82 to make them count up and down as the local pulses are delivered to the first preliminary counter $81_1$, from the pulse generator 78 through the AND gate 75 and conductor 76. The preliminary and the totalizing counters 81 and 82 thus serve as a single reversible counter. The totalizing counters 82 produce the totalizer output signal in a binary-coded, decimal form. The preliminary counters 81 adjust the decimal point, as will presently become clear. The first totalizing counter $82_1$ produces the binary-coded, decimal form indicative of the least significant digit of the totalizer output signal.

More particularly, in FIG. 8, it is again surmised that the rotatable permanent magnet 20 completes one rotation as water flows through the path, in either the normal or the reverse directions. Let it also be assumed that a display should be incrementally increased by "1" in the least significant digit of the totalizer output signal whenever 100 cc's of water are used. The predetermined number n should be equal to 2825 because $56.5/(2 \times 100) = 0.2825$. Therefore, the divide output terminals D are set to simultaneously produce logic "1" pulses when the counts in the first through the fourth conversion counters 77 reach "5," "2," "8" and "2," respectively. Under the circumstances, one local pulse is delivered from the pulse generator 78 to the first preliminary counter $81_1$ via conductor 76 each time that there is a water flow of 0.1 cc in either the normal or the reverse direction. For each flow of the desired unit of a water measure, the preliminary counters 81 are set for adding "one" or, as the case may be, for subtracting "one" in the totalizer output signal produced responsive to the first totalizing counter $82_1$.

It should now be understood that, according to the second embodiment of this invention, a water meter comprising four decimal conversion counters 77 and a pertinent number of preliminary counters 81 is capable of measuring the volume of the water used with an error of only 0.1%, even in worst case.

Figure 9:
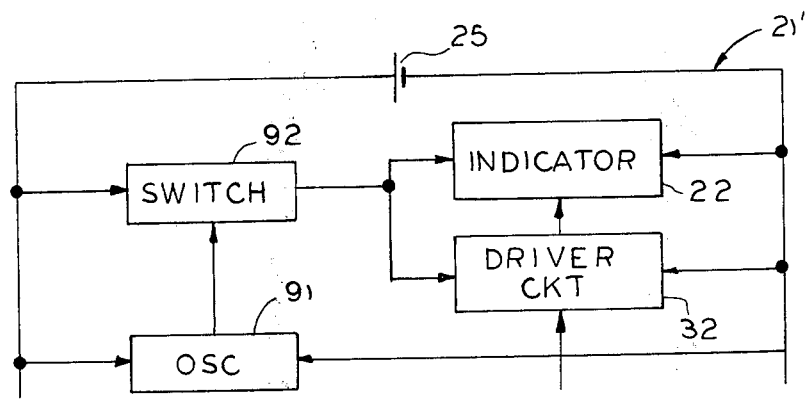
FIG. 9 is a partial block diagram of an electronic part of the invention for use in a water meter, according to a third embodiment of this invention.

Finally, FIG. 9 shows an electronic part 21" used in a water meter according to a third embodiment of this invention. Those parts which are similar to parts that have already been described are designated by like reference numerals, as in FIG. 3. Energized by the battery 25, an oscillator 91 produces a pulse sequence having a repetition frequency which is between about 20 and a few scores of hertz. An electronic switch 92 is controlled by an audio-frequency pulse sequence to intermittently energize the indicator 22 and the driver circuit 32. This enables a considerable savings of power from the battery 25, particularly when the duty cycle of the audio-frequency pulse sequence below about 50%. It is also possible to use a radio-frequency pulse sequence. Alternatively, it is possible to substitute a manually operable switch for the electronic switch 92, with the oscillator 91 omitted. The manually operable switch 92 is intermittently closed only when it is desired to read the volume of water indicated by the indicator 22.

While the invention has thus far been described in specific conjunction with a few embodiments thereof, it should now be obvious to those skilled in the art that this invention can also be put into practice in various other ways. For example, this invention is applicable to the nutating disk and the rotary piston water meters shown in "Water Meters: Selection, Installation, Testing, and Maintenance" of "AWWA M6 Meter Manual" published 1962 by American Water Works Association, Inc., New York, U.S.A., FIG. 9.4 (page 64) and FIG. 9.5 (page 66), respectively. This invention is equally well-applicable to a water meter in which it is possible to convert the movement of any body, which is movable in proportion to the volume of water to be measured. A water meter according to either the first or second embodiments may comprise only two ferromagnetic magnetoresistive elements.

When it is desirable for a center to monitor a plurality of water meters, according to this invention, the indicator 22 and the driver circuit 32 of each water meter should be either accompanied by or substituted for a modulator for modulating a carrier signal by, for example, the binary-coded, decimal signal produced by the totalizer circuit 24. The carrier signal may be either locally produced in the individual water meters or commonly supplied from the monitoring center. The individual water meters are identified by either frequency division or time division signals. In such a centralized water meter reading system, it may be convenient to supply the d.c. electric power to the water meters from the center.

When it is possible to disregard the reverse direction flow of water, a water meter according to this invention may comprise only one ferramagnetic magnetoresistive element. A variation in the resistance thereof and the consequent variation in the sensing current is used as a single sensor output signal. In this event, it is possible to use only one of the pulse producers 61–66 and 62–67, described in conjunction with FIG. 7. That pulse producer is used in combination with a single up-counting counter 68 to count the number of pulses of a single pulse sequence, which is shaped responsive to the single sensor output signal. Alternatively, it is possible to use an up-counter instead of the reversible counter 81–82 illustrated in FIG. 8.

Those who are skilled in the art will readily perceive how to modify the system. Therefore, the appended claims are to be construed to cover all equivalent structures which fall within the true scope and spirit of the invention.

What is claimed is:

1. In a water meter having a path for transmitting water which is to be measured by said meter, with said measurement being taken in terms of a predetermined unit of volume, a rotatable body positioned in said path to turn a number of times proportional to the volume of the water that flows through said path in either a normal or a reverse direction of flow, means for indicating the volume of the water used, and transmitting means responsive to rotation of said body for causing said indicating means to display the volume of the water used in terms of said predetermined unit, the improvement wherein said transmitting means comprises:
   a. a permanent magnet rotatable with said rotatable body;
   b. a magnetic field sensor positioned in the field of said permanent magnet, said sensor comprising first and second ferromagnetic magnetoresistive elements responsive to the rotating magnetic field of said magnet for respectively generating first and second output signals, said first and second elements producing a predetermined phase difference between said first and second output signals;
   c. wave-shaping means for shaping each of said first and second output signals to form first and second sequence of pulses;
   d. totalizing means comprising:
      (1) flow sense detecting means responsive to said first and second pulse sequences for producing a normal and an inverse flow pulse signals, the number of pulses of said normal flow of pulse signal and the number of pulses in said inverse flow of pulse signal being equal to twice the number of rotations of said magnet which are actually caused by the water flowing through said path in either said normal or said reverse directions, respectively; and
      (2) calculating means responsive to the pulses of said flow pulse signals to produce said totalizer output signal in terms of said predetermined units of volume, said calculating means subtracting a number of pulses of said inverse flow pulse signal from a number of pulses of said normal flow pulse signal; and
   e. means responsive to said totalizer output signal for driving said indicating means to display the amount of water that is used.

2. A water meter as claimed in claim 1, wherein said calculating means comprises:
   a. first pulse-generating means responsive to each pulse of said normal flow pulse signal for generating a first predetermined number of pulses;
   b. second pulse-generating means responsive to each pulse of said inverse flow pulse signal for generating said first predetermined number of pulses;
   c. first counting means for repeatedly counting a second predetermined number of the pulses generated by said first pulse-generating means in response to the pulses of said normal flow pulse signal, means responsive to said count reaching said second predetermined number for producing a count complete pulse;

d. second counting means for repeatedly counting said second predetermined number of the pulses generated by said second pulse-generating means in response to the pulses of said inverse flow pulse signal, means responsive to said count reaching said second predetermined number for producing a count complete pulse; and e. means for totalizing the number of count complete pulses successively produced by said first and said second counting means to provide said totalizer output signal, the number of count complete pulses produced by said second counting means being subtracted from the number of count complete pulses produced by said first counting means, the ratio of said second predetermined number as compared to said first predetermined number being equal to twice the ratio of said predetermined unit of volume as compared to the volume of the water actually flowing through said path to cause said rotatable permanent magnet to make one complete rotation.

3. A water meter as claimed in claim 1, wherein said calculating means comprises:

a. pulse-producing means responsive to each pulse of a single pulse signal for producing a predetermined number of pulses, said single pulse signal being one of said normal and said inverse flow pulse signals that said flow sense-detecting means produces; and b. signal-producing means for producing said totalizer output signal by totalizing the number of pulses produced by said pulse-producing means, the number of pulses produced by said pulse-producing means being in response to the pulses of said inverse flow pulse signal subtracted from the pulses produced by said normal flow pulse signal, twice said predetermined number being equal to the inverse ratio of said predetermined unit of volume as compared to the volume of water actually flowing through said path to cause said rotatable permanent magnet to make one complete rotation.

4. A water meter as claimed in claim 3, wherein said pulse-producing means comprises:

a. a pulse generator for producing a sequence of local pulses;

b. resettable counter means responsive to each pulse of said single pulse signal for supplying said predetermined number of the locally generated pulses to an output conductor to reset said counter means until an appearance in said single pulse signal of a pulse next following said each pulse; and c. said signal-producing means comprising reversible counter means responsive to said normal and said inverse flow pulse signals for counting the local pulses supplied by said resettable counter means in response to the pulses of said normal and said inverse flow pulse signals, the number of the local pulses counted during the presence of said inverse flow pulse signal being subtracted from the number of the local pulses counted during the presence of said normal flow pulse signal, said reversible counter means producing said totalizer output signal representative of the counted number of the local pulses.

5. A water meter as claimed in claim 1, further comprising a battery for energizing said indicating means, said sensing means, said wave-shaping means, said additional wave-shaping means, and said totalizing means, and means between said battery and said indicating means for intermittently connecting said battery to said indicating means.

6. The meter of claim 1 and means responsive to signal from said elements to indicate a net volume of water flowing in one direction.

7. The meter of claim 6 and calculator means for subtracting signals responsive to flow in one direction from signals responsive to flow in an opposite direction to arrive at said net volume.

* * * * *